United States Patent
Gehman et al.

(10) Patent No.: US 7,032,956 B2
(45) Date of Patent: Apr. 25, 2006

(54) RECREATIONAL VEHICLE WITH STORAGE CONTAINER

(75) Inventors: Dana K. Gehman, Somerset, PA (US); Thomas R. Podgorney, Borough of Conemaugh, County of Cambria, PA (US)

(73) Assignee: Fleetwood Folding Trailers, Inc., Somerset, PA (US)

(*) Notice: Subject to any disclaimer, the term of this patent is extended or adjusted under 35 U.S.C. 154(b) by 0 days.

(21) Appl. No.: 10/819,699

(22) Filed: Apr. 7, 2004

(65) Prior Publication Data

US 2004/0201247 A1    Oct. 14, 2004

Related U.S. Application Data

(60) Provisional application No. 60/461,151, filed on Apr. 8, 2003.

(51) Int. Cl.
*B60P 3/335*    (2006.01)

(52) U.S. Cl. .................. 296/168; 224/521; 224/519

(58) Field of Classification Search ............. 296/168, 296/26.13, 24.3, 37.6, 37.1, 185.1, 173, 182.1; 224/488, 519, 498, 527, 521, 528; 220/23.4, 220/527, 522, 564; 414/408; 312/228; D12/102; 280/407

See application file for complete search history.

(56) References Cited

U.S. PATENT DOCUMENTS

| | | | |
|---|---|---|---|
| 1,966,022 A * | 7/1934 | Sumner | 220/564 |
| 3,680,335 A * | 8/1972 | Onishi | 70/252 |
| 3,979,007 A * | 9/1976 | Thornbloom, Jr. | 220/522 |
| 4,103,960 A * | 8/1978 | Ziese | 296/37.1 |
| 4,214,670 A | 7/1980 | Berger et al. | |
| 4,310,279 A * | 1/1982 | Johnston | 414/408 |
| D265,301 S * | 7/1982 | Zander | D12/102 |
| 4,502,725 A | 3/1985 | Wiant | |
| 4,938,399 A * | 7/1990 | Hull et al. | 224/521 |
| 4,944,544 A | 7/1990 | Dick | |
| 4,946,215 A | 8/1990 | Taylor | |
| 5,029,740 A * | 7/1991 | Cox | 224/484 |
| 5,038,983 A * | 8/1991 | Tomososki | 224/521 |
| 5,106,002 A * | 4/1992 | Smith et al. | 224/521 |
| 5,203,479 A | 4/1993 | Lucas | |
| 5,310,100 A * | 5/1994 | Liscinsky | 224/521 |
| 5,439,151 A * | 8/1995 | Clayton | 224/521 |
| 5,454,477 A * | 10/1995 | Bornhorst et al. | 220/23.4 |
| 5,544,799 A * | 8/1996 | Didlake | 224/519 |
| 5,586,702 A * | 12/1996 | Sadler | 224/488 |
| 5,601,206 A * | 2/1997 | Haas et al. | 220/527 |
| 5,636,890 A | 6/1997 | Cooper | |
| 5,653,494 A * | 8/1997 | Cleall et al. | 296/168 |
| 5,657,916 A * | 8/1997 | Tackett | 296/37.6 |
| 5,658,032 A * | 8/1997 | Gardner | 296/26.13 |
| 5,683,157 A * | 11/1997 | Peterson et al. | 312/228 |
| 5,685,467 A * | 11/1997 | Niemi et al. | 220/528 |
| 5,881,937 A * | 3/1999 | Sadler | 224/527 |

(Continued)

*Primary Examiner*—Kiran B. Patel
(74) *Attorney, Agent, or Firm*—The Webb Law Firm

(57) ABSTRACT

A recreational vehicle, for example, a folding camping trailer, includes a chassis having wheels and a towing hitch, a trailer body attached to the chassis, and a storage container attached to the chassis. The storage container includes a seamless body defining an internal space for storing cargo and may define one or more access openings for a plurality of access doors. The seamless body is made of a substantially rigid material, such as plastic, and may be roto-molded to form the seamless body. The seamless body may further include an engagement panel configured for a mating connection with a corresponding receiving recess defined in the trailer body.

15 Claims, 10 Drawing Sheets

U.S. PATENT DOCUMENTS

| | | | |
|---|---|---|---|
| 5,979,972 A * | 11/1999 | Gehman | 296/173 |
| 6,012,212 A | 1/2000 | Erickson | |
| 6,036,070 A * | 3/2000 | Gauthier et al. | 224/527 |
| 6,139,080 A | 10/2000 | Saffold | |
| 6,193,924 B1 | 2/2001 | Huse | |
| 6,209,941 B1 | 4/2001 | Cross | |
| 6,213,539 B1 * | 4/2001 | Williams et al. | 296/185.1 |
| 6,237,823 B1 * | 5/2001 | Stewart et al. | 224/519 |
| 6,254,160 B1 * | 7/2001 | Marriott et al. | 296/24.3 |
| 6,276,736 B1 | 8/2001 | Cook et al. | |
| 6,283,537 B1 * | 9/2001 | DeVore, III | 296/168 |
| 6,332,639 B1 | 12/2001 | Tanaka et al. | |
| 6,398,290 B1 * | 6/2002 | Williams et al. | 296/185.1 |
| 6,471,104 B1 * | 10/2002 | Janek | 224/498 |
| 6,575,155 B1 * | 6/2003 | Brennan | 280/407 |
| D486,759 S * | 2/2004 | Armstrong | D12/102 |
| 6,725,855 B1 * | 4/2004 | Brennan | 224/519 |
| D495,276 S * | 8/2004 | Armstrong | D12/102 |
| 6,802,441 B1 * | 10/2004 | DuRant et al. | 224/521 |
| 2004/0173654 A1 * | 9/2004 | McAlister | 224/519 |

\* cited by examiner

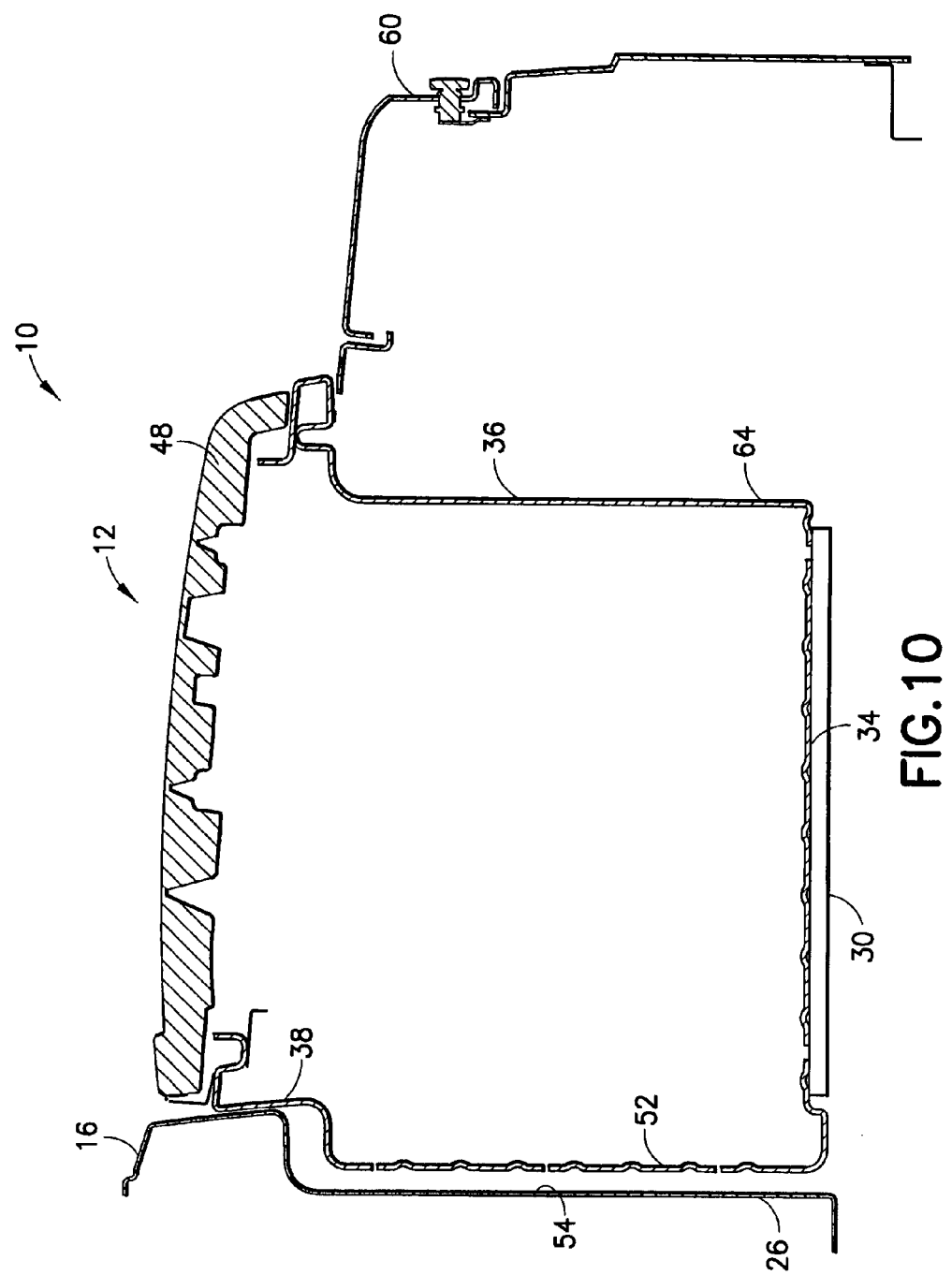

RECREATIONAL VEHICLE WITH STORAGE CONTAINER

CROSS REFERENCE TO RELATED APPLICATIONS

This application claims the benefit of U.S. Provisional Patent Application Ser. No. 60/461,151, filed Apr. 8, 2003, which is hereby incorporated by reference in its entirety.

BACKGROUND OF THE INVENTION

1. Field of the Invention

The present invention relates generally to recreational vehicles, such as folding camping trailers and travel trailers and, more particularly, to recreational vehicles having integrally formed or attached storage containers.

2. Description of Related Art

The use of recreational vehicles for comfortable travel is well known and continues to increase in popularity. Recreational vehicles include those that may be driven down the road as a self-contained unit and others that are towed, such as folding camping trailers and travel trailers. Besides providing shelter and creature comforts away from home, recreational vehicles must enable the owner to transport all manner of supplies and lifestyle accessories, such as bicycles, boats, camping gear, hunting gear, and the like.

Folding camping trailers, wherein major design goals include low cost, compact size, and light weight, present a particular challenge to their designers and manufacturers in providing protective storage areas for items that recreational vehicle owners are likely to transport in the use of their vehicles. Such items may include, for example, food, ice chests, firewood, camping equipment, and children's playthings.

Storage containers are commonly used on numerous types of vehicles, and their design, construction, and attachment methods vary widely in the field. For example, U.S. Pat. No. 6,332,639 to Tanaka et al. discloses a rear trunk for a motorcycle. The rear trunk includes a trunk portion and a lid portion, which are connected by hinges. U.S. Pat. No. 6,276,736 to Cook et al. discloses a storage compartment for a truck. The storage compartment is connected by flanges to a rear panel of the vehicle operator compartment of the truck. U.S. Pat. No. 6,209,941 to Cross discloses a utility box for use with an all-terrain vehicle (ATV). The utility box is connected to a rack on the ATV by bungee cords. U.S. Pat. No. 6,139,080 to Saffold discloses a removable storage apparatus for use on the bed of a pickup truck. The storage apparatus includes a lid section and a container section that are connected by hinges.

A common shortcoming of storage containers presently used on vehicles, such as those described above, is an inherent weakness at the seams or joints of the storage containers. For example, seams connect the sides and bottoms of the storage containers, and often further connect the lid or doors to the top or sides of the storage containers. Additionally, a seam or joint is often utilized to join the storage container to the structure of a vehicle body. While the number and nature of assembly joints or seams vary by manufacturer, they all typically share the major assembly joints where the storage container meets the structure of a vehicle body.

The use of numerous seams or joints increases the chance that water or debris will enter into the storage container. The intrusion of unwanted water into the storage container can damage articles stored therein. In addition, the major seam or joint where the storage container meets, for example, the trailer body of a folding camping trailer is especially problematic because it is susceptible to movement caused by "flexing" of the trailer chassis, which is common during towing.

In general, storage containers in folding camping trailers are attached to the folding camping trailer by way of multiple attachment points on the horizontally-oriented trailer chassis as well as multiple attachment points on the vertically-oriented front or rear structure of the trailer body of the folding camping trailer. The vertical joint, in particular, is problematic because when the trailer chassis flexes, the vertical joint is subjected to forces that can act to loosen or dislodge the joint to the point where weather-sealing materials, typically caulking and adhesive tapes, are exposed. The situation is especially prevalent when the storage container is loaded in excess of its manufacturer load rating, which is believed to be a common, if unintentional, practice. Once the weather sealing integrity of this vertical joint has been compromised, prolonged and unchecked water intrusion can cause major damage to the contents of the storage container, the storage container itself, and to the trailer body.

In view of the foregoing, there is a need for an improved storage container for use with recreational vehicles that exhibits weather-resistance but may be easily manufactured and assembled to the recreational vehicle.

SUMMARY OF THE INVENTION

The present invention is a recreational vehicle having a storage container for storing cargo therein. The recreational vehicle of the present invention includes a chassis, a trailer body, and a storage container. The chassis has wheels and typically a towing hitch. The trailer body is attached to the chassis. The storage container includes a seamless body, which defines an internal space for storing cargo and is also attached to the chassis. The seamless body typically has no structural interconnection with the trailer body.

The seamless body is made of a rigid material, such as plastic. The seamless body may be a roto-molded seamless body. The seamless body may define a plurality of access openings for a plurality of access doors, but typically includes at least one access door used to enclose at least one access opening formed in the seamless body. The seamless body may further include an engagement panel configured for a mating connection with the trailer body, such as in a mating receiving recess formed in the trailer body. An LP shroud may be attached to the seamless body. The seamless body may define a pass-through opening for access to the trailer body. The seamless body may be configured for mechanical attachment to a front end or rear end of the trailer body. Additionally, the seamless body may define one or more recesses for mounting one or more reflectors to the seamless body to warn following or preceding motorists of the location of the recreational vehicle.

The present invention is also a storage container for use with the recreational vehicle, such as a folding camping trailer or travel trailer. The storage container includes a seamless body defining an internal open space for storing cargo and is configured for connection to a chassis of the recreational vehicle. The storage container may have at least one access door to provide access to the internal open space through at least one access opening formed in the seamless body. The seamless body is made of a rigid material, such as plastic. The seamless body may be a roto-molded seamless body. The seamless body may define a plurality of access openings for a plurality of access doors. The seamless body may further include an LP shroud attached to the seamless body. The seamless body is preferably configured for mechanical attachment to the chassis. The seamless body may define a pass-through opening for access to the trailer body. The seamless body may include an engagement panel adapted for a mating connection with the trailer body, such as in a mating receiving recess formed in the trailer body. Additionally, the seamless body may define one or more recesses for mounting one or more reflectors to the seamless body.

The present invention is further directed to a method of assembling a recreational vehicle. The method generally includes providing a chassis having wheels, attaching a trailer body to the chassis, rotationally molding a seamless body defining an internal open space for storing cargo, and attaching the seamless body to the chassis proximate to the trailer body. Additionally, the seamless body may include an engagement panel and the method may further include mating the engagement panel of the seamless body to a receiving recess formed in the trailer body. Further, the method may include mounting the seamless body to a front end of the trailer body.

Further details and advantages of the present invention will become apparent from the following detailed description, when read in conjunction with the drawings, wherein like reference numerals represent like parts throughout.

BRIEF DESCRIPTION OF THE DRAWINGS

FIG. 10 is a schematic cross-sectional view of the storage container of FIG. 9, shown attached to the front panel of the trailer body, and further showing the LP shroud attached to the storage container.

DETAILED DESCRIPTION OF THE INVENTION

Figure 1:
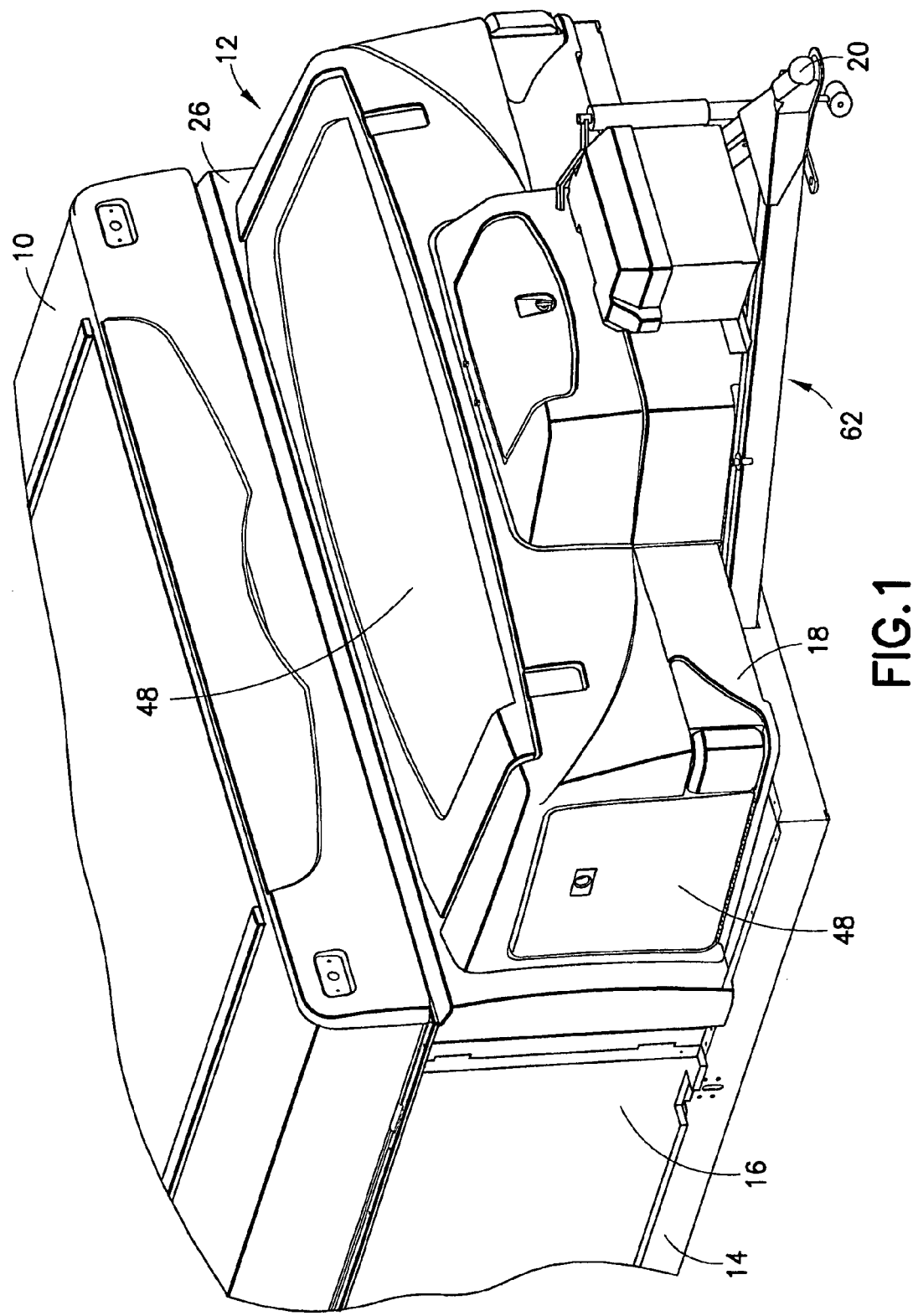
FIG. 1 is a front perspective view of a recreational vehicle having a storage container in accordance with the present invention.
Figure 2:
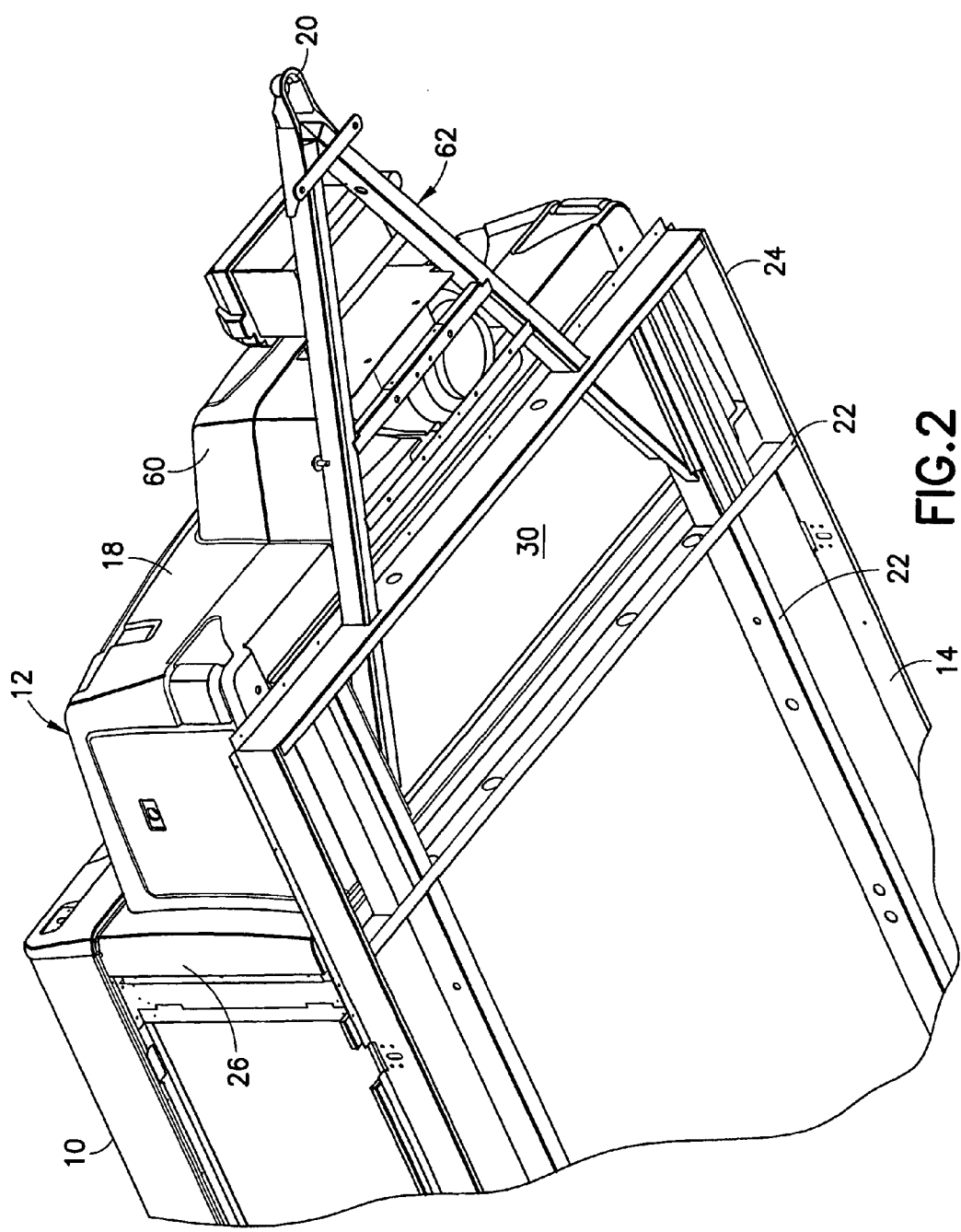
FIG. 2 is a bottom perspective view of the recreational vehicle shown in FIG. 1.
Figure 3:
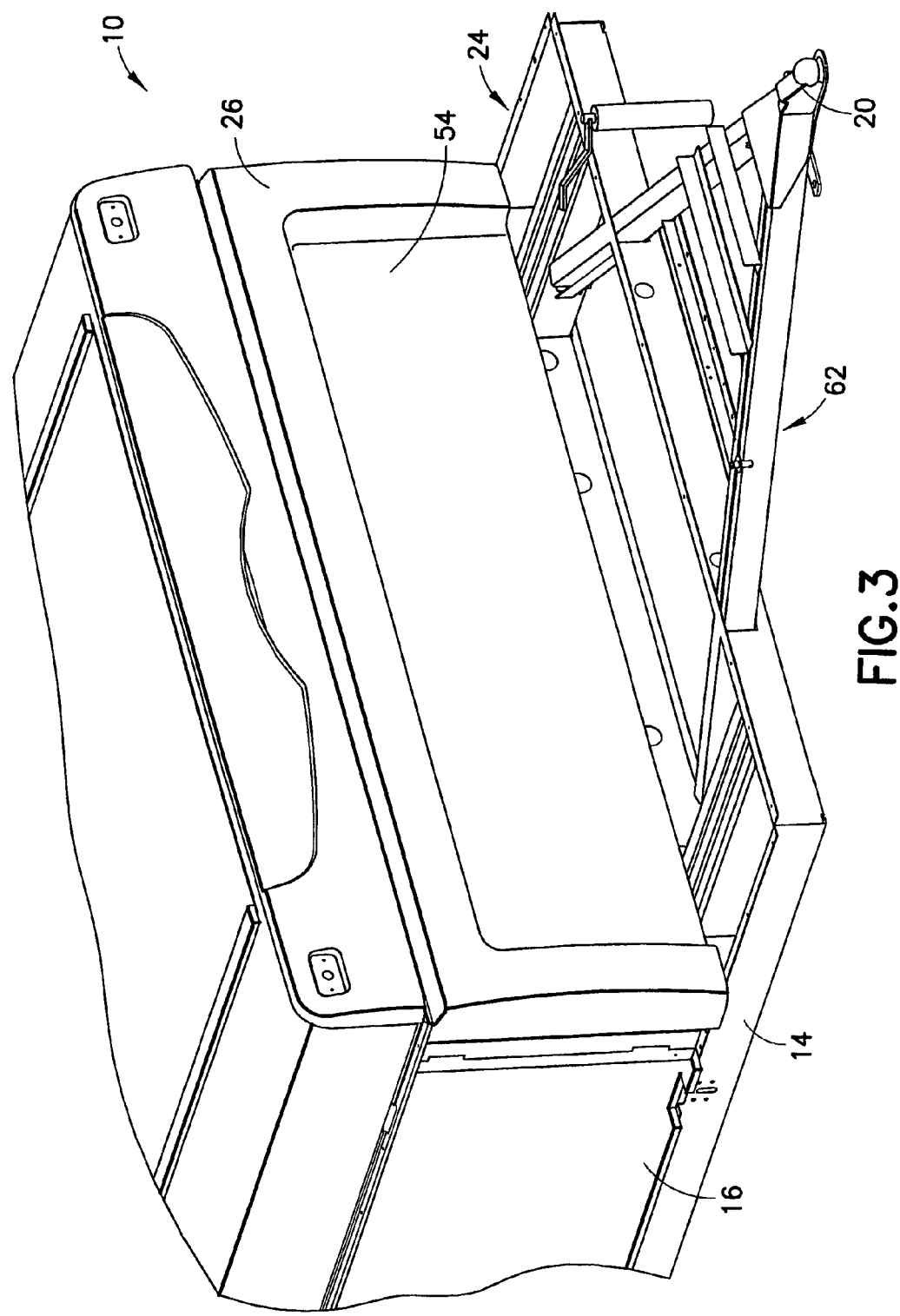
FIG. 3 is a front perspective view of the recreational vehicle of FIG. 1 without the storage container.
Figure 4:
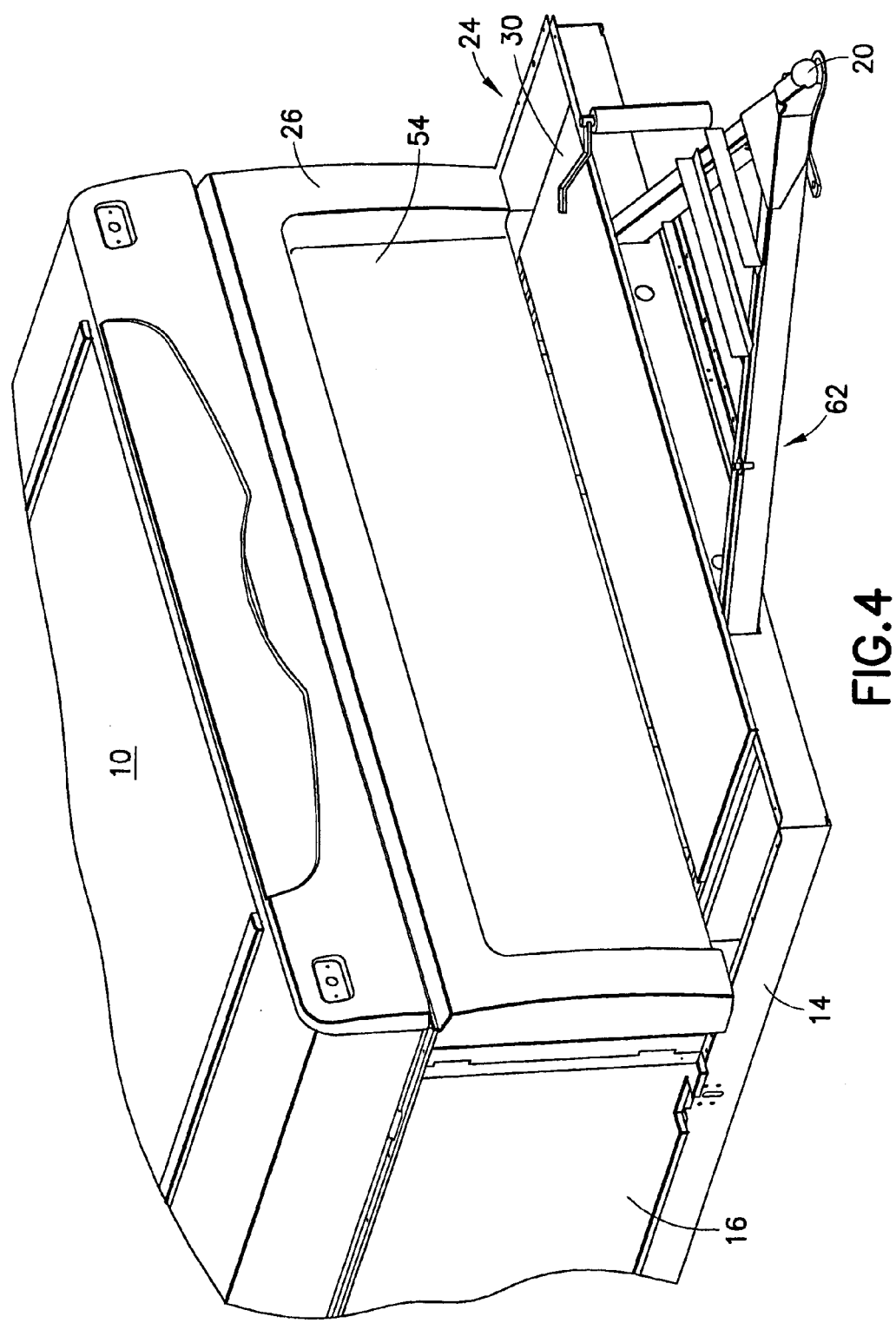
FIG. 4 is a front perspective view of the recreational vehicle of FIG. 3 with decking on a chassis of the recreational vehicle for supporting the storage container.

For purposes of the description hereinafter, the terms "upper", "lower", "right", "left", "vertical", "horizontal", "top", "bottom", and derivatives thereof, shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered limiting.

FIGS. 1–4 show a recreational vehicle in the form of a folding camping trailer 10 in accordance with the present invention. The folding camping trailer 10 (hereinafter "the trailer 10") includes a storage container 12. While the storage container 12 is described hereinafter in detail in connection with the trailer 10, the storage container 12 may be used in connection with any type of recreational vehicle, such as folding camping trailers, travel trailers, etc. The trailer 10 may be towed by a towing vehicle (not shown), such as a car, minivan, truck, or sport utility vehicle. The trailer 10 generally includes a chassis 14, a trailer body 16 attached to the chassis 14, and the storage container 12 attached to the chassis 14 adjacent or proximate to the trailer body 16. The storage container 12 is comprised of a seamless body 18 defining an internal open space 19 for storing cargo, and is preferably made of a rigid material, as will be described in more detail herein with reference to FIGS. 5–10.

The chassis 14 includes wheels (not shown) and an integrally formed towing hitch 20. The trailer body 16 generally includes a first or front panel 26, preferably an ABS thermnoformed body panel, and a second or rear panel (not shown) having a similar construction. The trailer body 16 is attached to the chassis 14 so that the front panel 26 of the trailer body 16 faces the towing hitch 20. The storage container 12 is preferably attached to the chassis 14 between the front panel 26 of the trailer body 16 and the towing hitch 20. The storage container 12 may also be provided at the rear end of the trailer body 16 adjacent the rear panel as would be understood by one skilled in the art.

The chassis 14 is formed by a plurality of rigid support members 22 that are welded or mechanically fastened together in a conventional manner. The chassis 14 further includes an extended front support structure 24 for supporting the storage container 12. The extended front support structure 24 provides additional space at the front of the chassis 14 for the attachment of the storage container 12 and the structural support necessary to support the storage container 12. The front support structure 24 may vary in size to accommodate different sized storage containers 12 and is preferably sized to the dimensions of the storage container 12. However, the width of the front support structure 24 is generally limited to the overall width of the trailer body 16. The chassis 14 is preferably made of steel or a similar rigid material.

Decking 30, such as plywood, may be attached to the extended front support structure 24 to support the storage container 12 on the support structure 24. The decking 30 is preferably mounted on the extended support structure 24 of the chassis 14, for example, by mechanical fasteners. The storage container 12 is placed on the decking 30. The decking 30 provides additional support for the storage container 12 on the chassis 14. The dimensions of the decking 30 may vary but are preferably sized to be the same width as the front panel 26 of the trailer body 16, and the width of the extended front support structure 24. The decking 30 may be made of any rigid material, such as plywood, as indicated previously, steel, or plastic.

Figure 5:
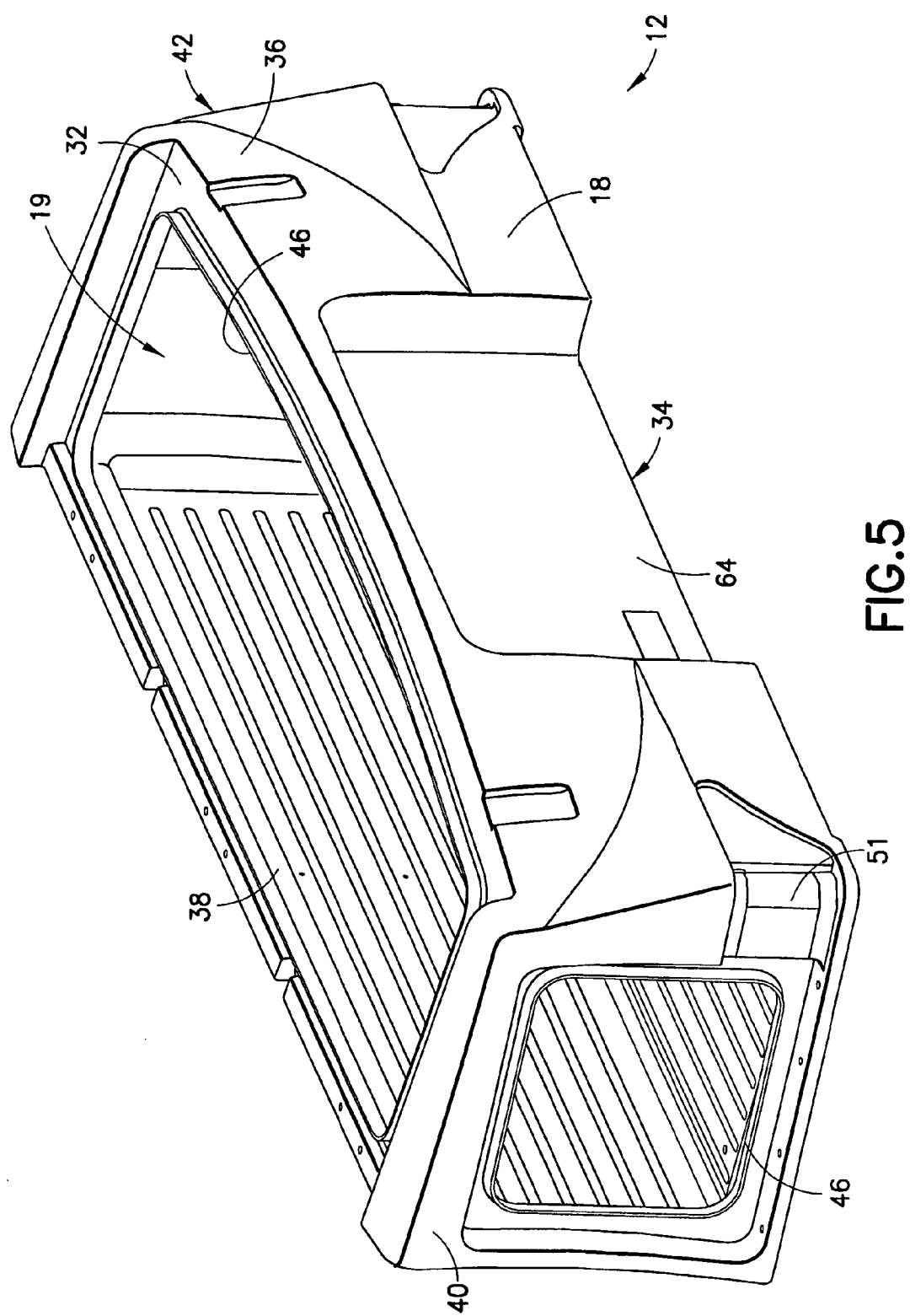
FIG. 5 is a top, front perspective view of the storage container, further defining access openings in accordance with the present invention.
Figure 6:
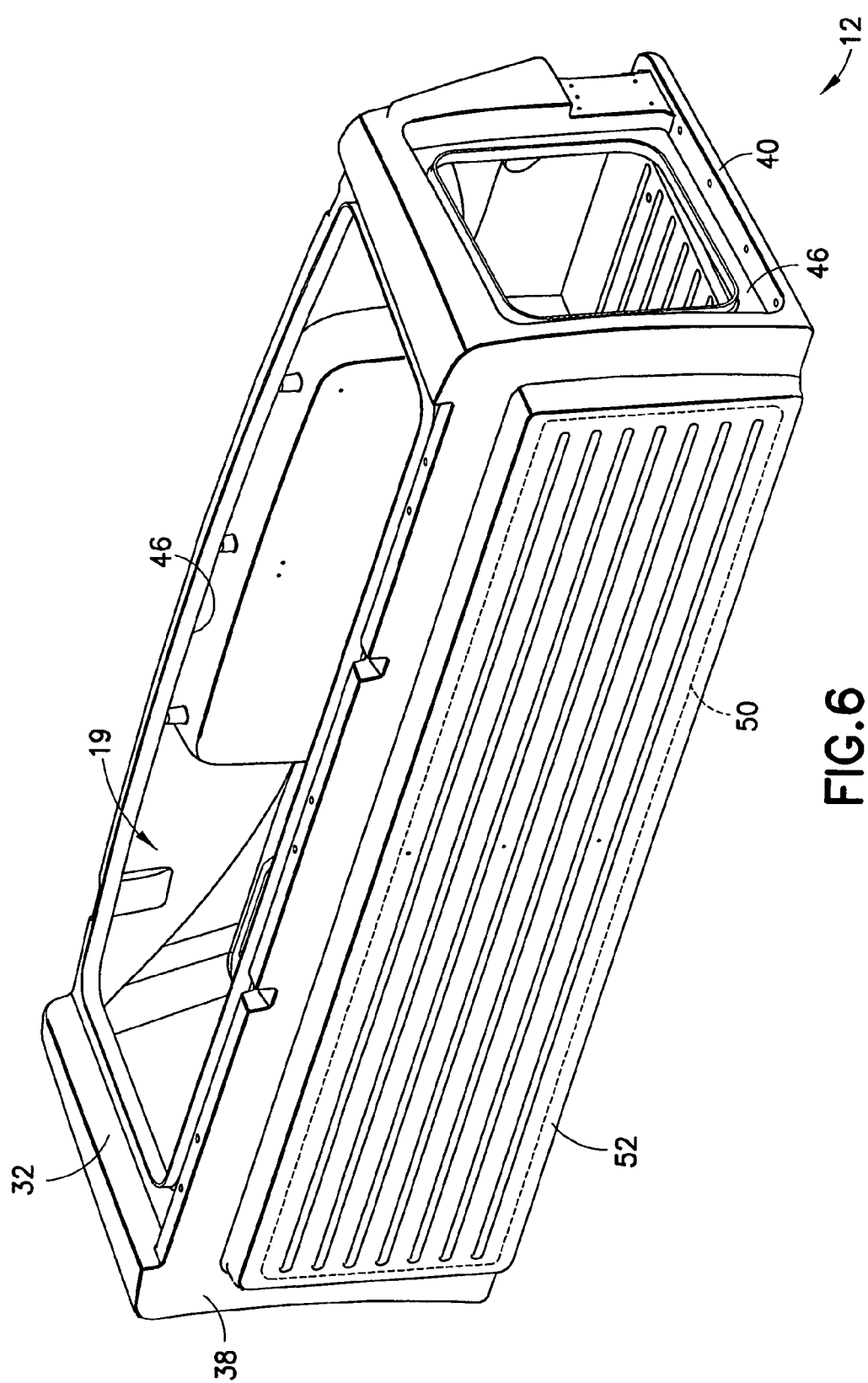
FIG. 6 is a top, rear perspective view of the storage container of FIG. 5.
Figure 7:
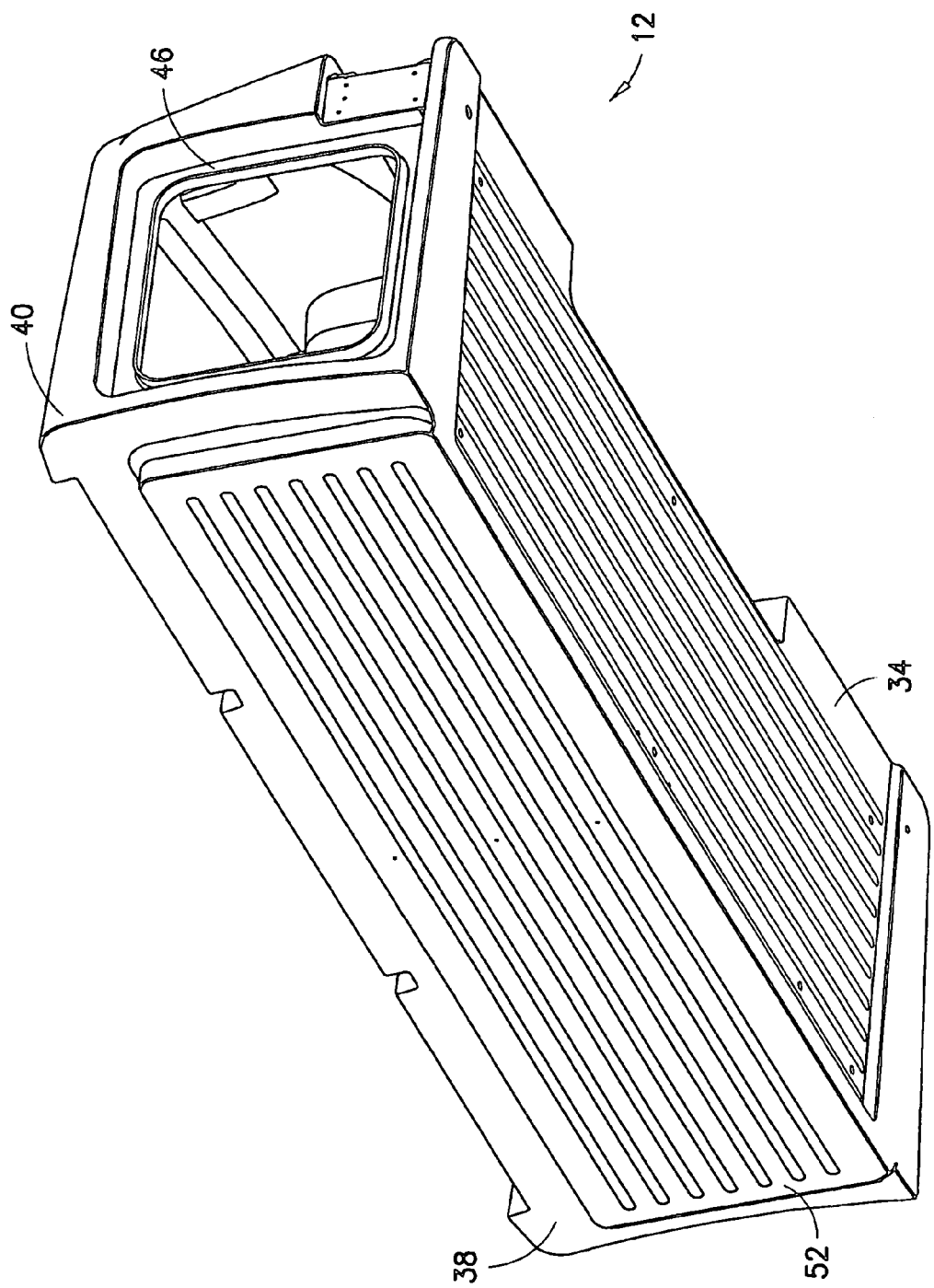
FIG. 7 is a bottom, rear perspective view of the storage container of FIG. 5.

Referring to FIGS. 5–7, the storage container 12 is shown detached from the trailer body 16. The storage container 12 is a one-piece seamless volumetric container, preferably having six sides. The storage container 12 may have any type of geometric shape, but a rectangular-shaped storage container is preferred. The storage container 12 is generally formed by the seamless body 18, which defines the internal open space 19. The internal open space 19 is defined by a top side 32, a bottom side 34, a front side 36, a rear side 38, and a pair of opposing ends or sides 40, 42 of the seamless body 18. The sides 32–42 defining the internal open space 19 may have a textured surface. For example, the rear side 38 and bottom side 34 may have textured surfaces as illustrated in FIG. 7.

As discussed previously, the seamless body 18 is preferably made of plastic. The use of plastic is advantageous for many reasons. For example, plastic is a lightweight material and, as a result, does not impose additional weight constraints on the recreational vehicle 10. Reduced weight will increase the fuel efficiency of the recreational vehicle 10, particularly when the recreational vehicle 10 is a self-contained vehicle (i.e., travel trailer) or a driveable motor vehicle. Additionally, plastic has the ability to provide great surface resistance to environmental conditions, such as snow and rain. Plastic also does not rust and is water repellent. The use of plastic is also cost effective when manufacturing the storage container 12 in accordance with the present invention.

The seamless body 18 is preferably manufactured by a rotational molding process. This process allows the storage container 12 to be formed as a homogeneous structure and eliminates seams or joints in the structure. By producing such a seamless homogeneous structure, the possibility of water entering the storage container 12 through seams is eliminated. The seamless body 18 allows for the articles within the storage container 12 to remain protected from external conditions. Rotational molding or roto-molding techniques are well-known in the art. Exemplary roto-molding processes for forming storage containers are found in U.S. Pat. Nos. 4,214,670 to Berger et al.; 6,193,924 to Huse; and 6,012,212 to Erickson, which are incorporated herein by reference.

Additionally, the storage container 12 preferably has a plurality of access openings 46 to allow access to the internal open space 19. The access openings 46 may be located on the top side 32, front side 36, and/or opposing ends 40, 42 of the storage container 12. The access opening 46 in the top side 32 of the storage container 12 may be enclosed with a lid or access door to allow easy access to the internal open space 19 within the storage container 12 when the trailer 10 is set up at a camp site. The access openings 46 preferably have corresponding access doors 48 (see FIG. 1), which are used to seal the access openings 46. The access doors 48 are cutouts corresponding in shape and size to the access openings 46. The access doors 48 are mounted in the access openings 46, preferably with the use of hinges, joints, and the like. For example, the access openings 46 may include recesses which allow the access doors 48 to set inward. This arrangement places the outward surface of the access doors 48 and the storage container 12 side in a flush configuration. The recess may also have a raised perimeter edge opening for attaching a gasket which seals against the inside surface of the hinged access doors 48. Further, the storage container 12 may define a pass-through area or opening 50 (shown as dotted lines in FIG. 6) in the rear wall or side 38, which forms a passageway to provide easy access from the interior of the trailer body 16 to the internal open space 19 of the storage container 12, without leaving the internal living space defined by the trailer body 16, if desired.

Optionally, the storage container 12 defines a plurality of recesses for receiving a plurality of reflectors 51 which are viewable by other drivers following or preceding the trailer 10 when the trailer 10 is being towed. The reflectors 51 may be located on the front side 36 of the storage container 12, on the opposing ends 40, 42 of the storage container 12, or in both locations. Preferably, the reflectors 51 are located at the bottom of the front side 36 and at the bottom of the opposing ends 40, 42 so as to form an outline of the storage container 12.

Referring to FIGS. 5–8, the storage container 12 includes an engagement panel 52 that extends or projects outward from the rear side 38 of the seamless body 18. The engagement panel 52 may have a textured surface and may be of any shape, but is preferably similar in form to the rear side 38 of the seamless body 18. The engagement panel 52 may also be of any size. With the aid of the front panel 26, the engagement panel 52 maximizes the storage container's 12 internal open space 19 and provides structural support to the rear side 38.

Figure 8:
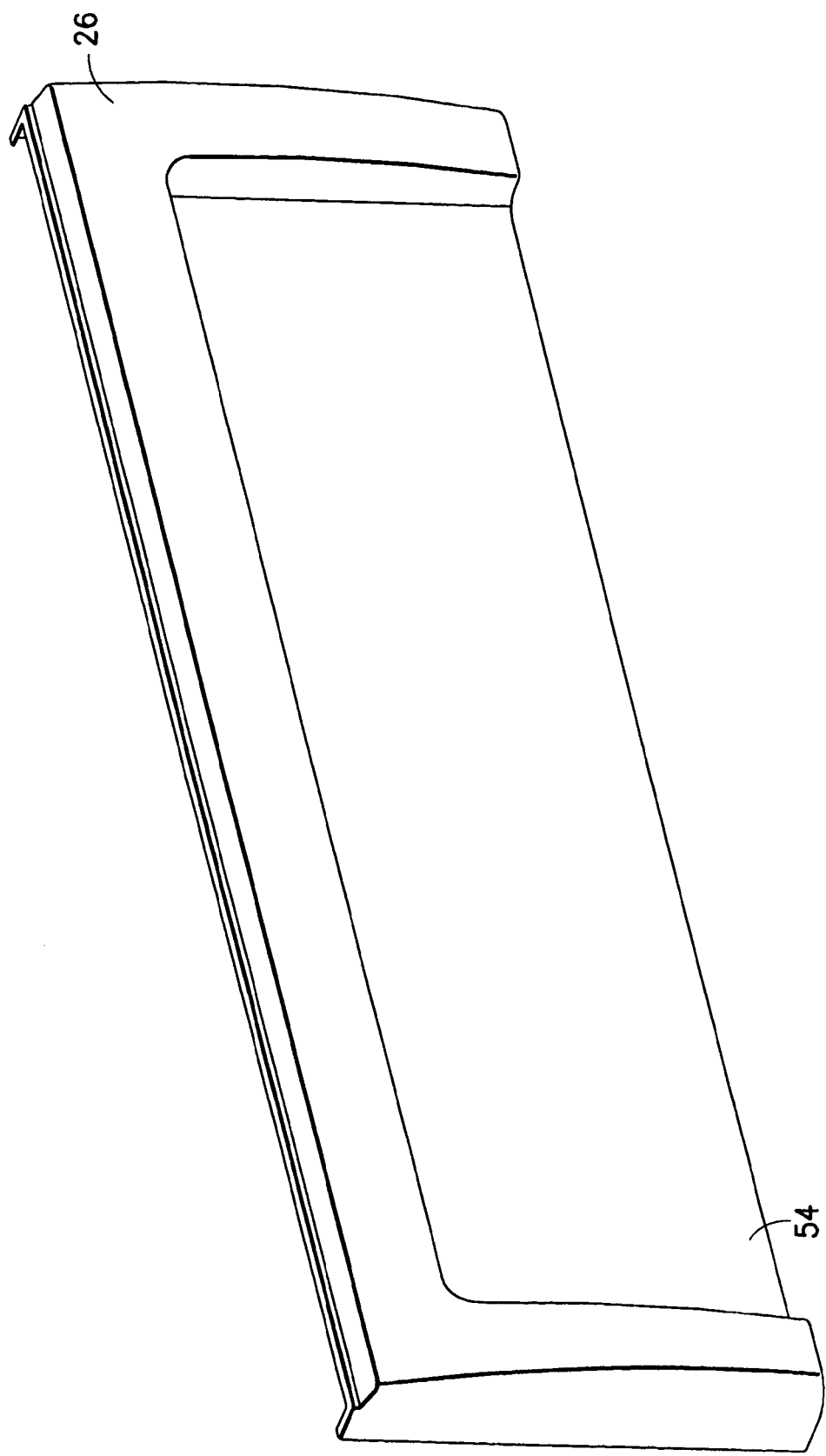
FIG. 8 is a perspective view of a front panel of a trailer body of the recreational vehicle shown in FIG. 3.

The front panel 26 of the trailer body 16 defines a receiving recess 54, as illustrated in FIG. 8, where the storage container 12 may be mated with the trailer body 16. In particular, the engagement panel 52 is preferably mated with the receiving recess 54 in the front panel 26 of the trailer body 16. The receiving recess 54 may vary in size, such as being the entire area of the front panel 26 of the trailer body 16 or only a portion of the front panel 26 of the trailer body 16, so long as the size and shape of the receiving recess 54 generally corresponds to the size and shape of the engagement panel 52 on the rear side 38 of the seamless body 18. Typically, the front panel 26 and engagement panel 52 are not physically interconnected.

The storage container 12 is structurally connected to the support structure 24 of the chassis 14 by suitable mechanical connections therebetween. For example, the storage container 12 may have eight clearance holes drilled in a bottom surface of the storage container 12 for mounting the storage container 12 to the extended front support structure 24 of the chassis 14, and to allow for expansion and contraction of the material. The storage container 12 is preferably bolted to the support structure 24 using for example, ¼" bolts, nuts, and rubber washers and the like. The engagement panel 52 optionally allows the storage container 12 to be connected to the trailer body 16 without structural or physical connections between the rear side 38 of the seamless body 18 and the front panel 26 of the trailer body 16. Thus, as the chassis 14 of the trailer body 16 flexes during towing, there is no structural or physical connection along the vertical interface between the rear side 38 of the seamless body 18 and the front panel 26 of the trailer body 16. In addition, the rotational molding of the storage container 12 further prevents leakage because the storage container 12 is formed as a homogeneous structure without the use of seams or joints.

Figure 9:
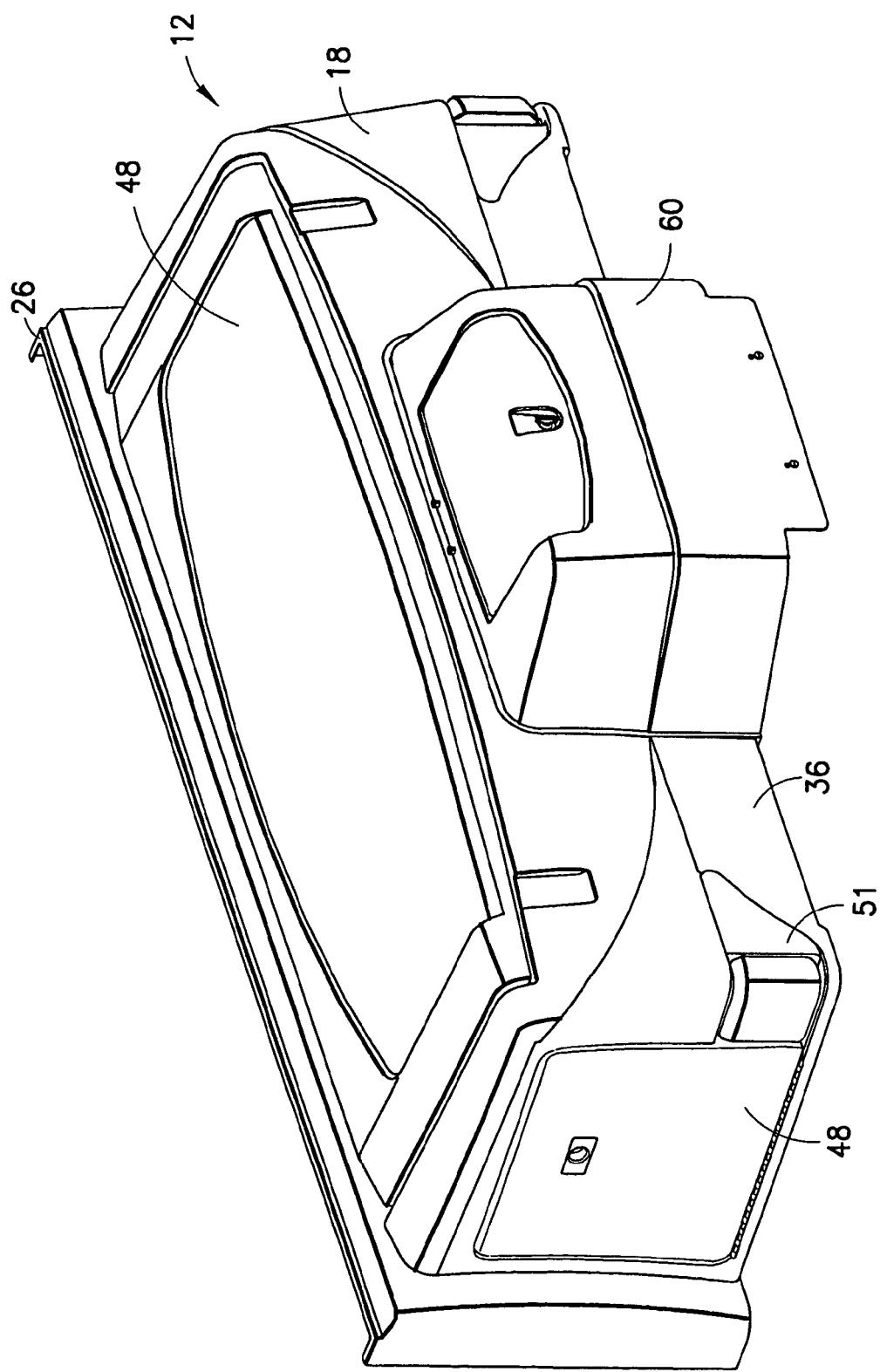
FIG. 9 is a perspective view of the storage container with an LP shroud in accordance with another embodiment of the present invention.

FIG. 9 illustrates a second embodiment of a storage container 12 in accordance with the present invention. The front side 36 of the seamless body 18 may further include a removable LP shroud 60. The LP shroud 60 is a shroud for a propane tank. The LP shroud 60, which is preferably also made by rotational molding, is attached to a triangular-shaped support 62 formed by the chassis 14 forward of the front support structure 24. The LP shroud 60 may be connected to the storage container 12 in an analogous manner to the way in which the storage container 12 is connected to the front panel 26 of the trailer body 16. For example, the front side 36 of the storage container 12 may define a receiving recess 64 similar to the receiving recess 54 in the front panel 26 (or rear panel as desired) of the trailer body 16. However, the LP shroud 60 preferably does not have a bottom or back surface extending into the receiving recess 64. The LP shroud 60 may be attached along its bottom front edge to the support structure 24 and at the top of the receiving recess 64 to the storage container 12. The LP shroud 60 may be secured with aluminum brackets, rivets, and screws. Additionally, other items for camping may also be attached to the storage container 12 or the LP shroud 60, such as a battery bag (not shown) and the like.

FIG. 10 illustrates schematically the arrangement of the trailer body 16, the storage container 12, and the LP shroud 60 at the front end of the trailer 10. The front panel 26 of the trailer body 16 defines the receiving recess 54 in which the engagement panel 52 of the seamless body 18 mates. The engagement panel 52 of the seamless body 18 extends outward such that when the engagement panel 52 is mated with the receiving recess 54 of the front panel 26 of the trailer body 16, there is a visual integration between the storage container 12 and the trailer body 16, which enhances the aesthetic appearance of the trailer 10.

The present invention is also directed to a method of assembling the trailer 10. Initially, the trailer body 16 is mounted to the chassis 14. The storage container 12 is attached to the chassis 14 proximate or adjacent to the trailer body 16, either at the front or rear ends of the chassis 14. To connect the container 12 to the trailer body 16, the engagement panel 52 is mated with the receiving recess 54 in the front panel 26 of the trailer body 16. As discussed hereinabove, this arrangement allows the storage container 12 to be attached to the trailer body 16 without direct structural or physical connections along the vertical interface between the front panel 26 of the trailer body 16 and the rear side 38 of the seamless body 18.

While the present invention was described with reference to preferred embodiments of recreational vehicles with storage containers, those skilled in the art may make modifications and alterations to the present invention without departing from the scope and spirit of the invention. Accordingly, the above detailed description is intended to be illustrative rather than restrictive. The invention is defined by the appended claims, and all changes to the invention that fall within the meaning and range of equivalency of the claims are to be embraced within their scope.

The invention claimed is:

1. A storage container comprising a seamless body defining an internal space for storing cargo, the seamless body configured for connection to a chassis of a trailer body, and the seamless body having at least one access door to provide access to the internal space through at least one access opening in the seamless body, the seamless body further comprising an engagement panel extending outward from the seamless body and adapted to cooperate with a corresponding receiving recess defined in the trailer body.

2. The storage container of claim 1, wherein the seamless body is made of a rigid material.

3. The storage container of claim 2, wherein the rigid material is plastic.

4. The storage container of claim 1, wherein the seamless body is a roto-molded seamless body.

5. The storage container of claim 1, wherein the seamless body defines a plurality of access openings for a plurality of access doors.

6. The storage container of claim 1, wherein the seamless body is configured for mechanical attachment to the chassis.

7. The storage container of claim 1, wherein the seamless body defines at least one recess for mounting at least one reflector to the seamless body.

8. The storage container of claim 1, further comprising an LP shroud attached to the seamless body.

9. A recreational vehicle, comprising:
a chassis having wheels and a towing hitch;
a trailer body attached to the chassis; and
a seamless body attached to the chassis, the seamless body defining an internal space for storing cargo and made of a rigid material, and the seamless body having at least one access door to provide access to the internal space through at least one access opening in the seamless body, the seamless body further comprising an engagement panel extending outward from the seamless body and cooperating with a corresponding receiving recess defined in the trailer body.

10. The recreational vehicle of claim 9, wherein the seamless body is a roto-molded seamless body.

11. The recreational vehicle of claim 9, wherein the seamless body defines a plurality of access openings for a plurality of access doors.

12. The recreational vehicle of claim 9, further comprising an LP shroud attached to the seamless body.

13. The recreational vehicle of claim 9, wherein the seamless body defines at least one recess for mounting at least one reflector to the seamless body.

14. The recreational vehicle of claim 9, wherein the seamless body is configured for mechanical attachment to a front end of the chassis.

15. The recreational vehicle of claim 9, wherein the seamless body is configured for mechanical attachment to a rear end of the chassis.

* * * * *